United States Patent
Iwamura et al.

(10) Patent No.: US 12,192,453 B2
(45) Date of Patent: Jan. 7, 2025

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 131 days.

(21) Appl. No.: 17/680,945

(22) Filed: Feb. 25, 2022

(65) Prior Publication Data
US 2022/0182621 A1    Jun. 9, 2022

Related U.S. Application Data

(63) Continuation of application No. PCT/JP2020/032782, filed on Aug. 28, 2020.

(30) Foreign Application Priority Data

Aug. 29, 2019  (JP) ................. 2019-157240

(51) Int. Cl.
*H04N 19/86* (2014.01)
*H04N 19/117* (2014.01)
*H04N 19/176* (2014.01)
*H04N 19/46* (2014.01)
*H04N 19/82* (2014.01)

(52) U.S. Cl.
CPC ......... *H04N 19/117* (2014.11); *H04N 19/176* (2014.11); *H04N 19/46* (2014.11); *H04N 19/82* (2014.11)

(58) Field of Classification Search
CPC .... H04N 19/117; H04N 19/176; H04N 19/46; H04N 19/82
See application file for complete search history.

(56) References Cited

U.S. PATENT DOCUMENTS 8,805,100 B2 * 8/2014 Ikai .................. H04N 19/70
                                                382/233
2018/0218512 A1 * 8/2018 Chan ................... H04N 19/122
(Continued)

FOREIGN PATENT DOCUMENTS

CN      101222645 A  *  7/2008  ............ H04N 19/00
WO      2018/123444 A1     7/2018

OTHER PUBLICATIONS

International Search Report issued in PCT/JP2020/032782; mailed Oct. 13, 2020.
(Continued)

*Primary Examiner* — Patrick E Demosky
(74) *Attorney, Agent, or Firm* — Studebaker & Brackett PC

(57) ABSTRACT

An encoding device that performs encoding on each of blocks obtained by dividing an image includes: a weighted bi-predictor 181*a* configured to generate a prediction block of an encoding-target block by weighted-averaging a plurality of reference images using weighted coefficients selected from a weighted coefficient set including a plurality of weighted coefficients; and a filter controller 161 configured to control deblocking filter based on the weighted coefficients applied by the weighted bi-predictor 181*a* to each of the two blocks adjacent blocks.

11 Claims, 5 Drawing Sheets

(56) References Cited

U.S. PATENT DOCUMENTS

2019/0313094 A1* 10/2019 Kanoh ............... H04N 19/61
2019/0313095 A1* 10/2019 Ikeda ............... H04N 19/157
2020/0077089 A1* 3/2020 Lee ............... H04N 19/117

OTHER PUBLICATIONS

Recommendation ITU-T H.265, High efficiency video coding, International Telecommunication Union, Dec. 2016, pp. 1-664.

Wamura, Shunsuke, et al., Non-CE5: Boundary strength derivation of deblocking filter for transform-skipped block, Joint Video Experts Team (JVET) of ITU-TSG 16 WP 3 and ISO/IEC JTC 1/SC 29/WG 11, JVET-O0656, 15th Meeting: Gothenburg, SE, Jul. 3-12, 2019, pp. 1-7.

Kotra, Anand Meher et al., AHG18/Non-CE5: Boundary strength fix for coding units using BCW, Joint Video Experts Team (JVET) of ITU-T SG 16 WP 3 and ISO/IEC JTC 1/SC 29/WG 11, JVET-P0109-v2, 16th Meeting: Geneva, CH, Oct. 1-11, 2019, pp. 1-7.

Tsai, Chia-Ming et al., CE5-related: Deblocking considering prediction weights in BCW and TPM, Joint Video Experts Team (JVET) of ITU-T SG 16 WP 3 and ISO/IEC JTC 1/SC 29/WG 11, JVET-P0161-v2, 16th Meeting: Geneva, CH, Oct. 1-11, 2019, pp. 1-7.

Meng, Xuewei et al., AHG18/Non-CE5: Deblocking for TPM and BCW, Joint Video Experts Team (JVET) of ITU-T SG 16 WP 3 and ISO/IEC JTC 1/SC 29/WG 11, JVET, P0269-v2, 16th Meeting: Geneva, CH, Oct. 1-11, 2019, pp. 1-8.

Wamura, Shunsuke et al., [AHG18] [Non-CE5] Proposed cleanup of deblocking filter process, Joint Video Experts Team (JVET) of ITU-T SG 16 WP 3 and ISO/IEC JTC 1/SC 29/WG 11, JVET-P0586-v2, 16th Meeting: Geneva, CH, Oct. 1-11, 2019, pp. 1-13.

\* cited by examiner

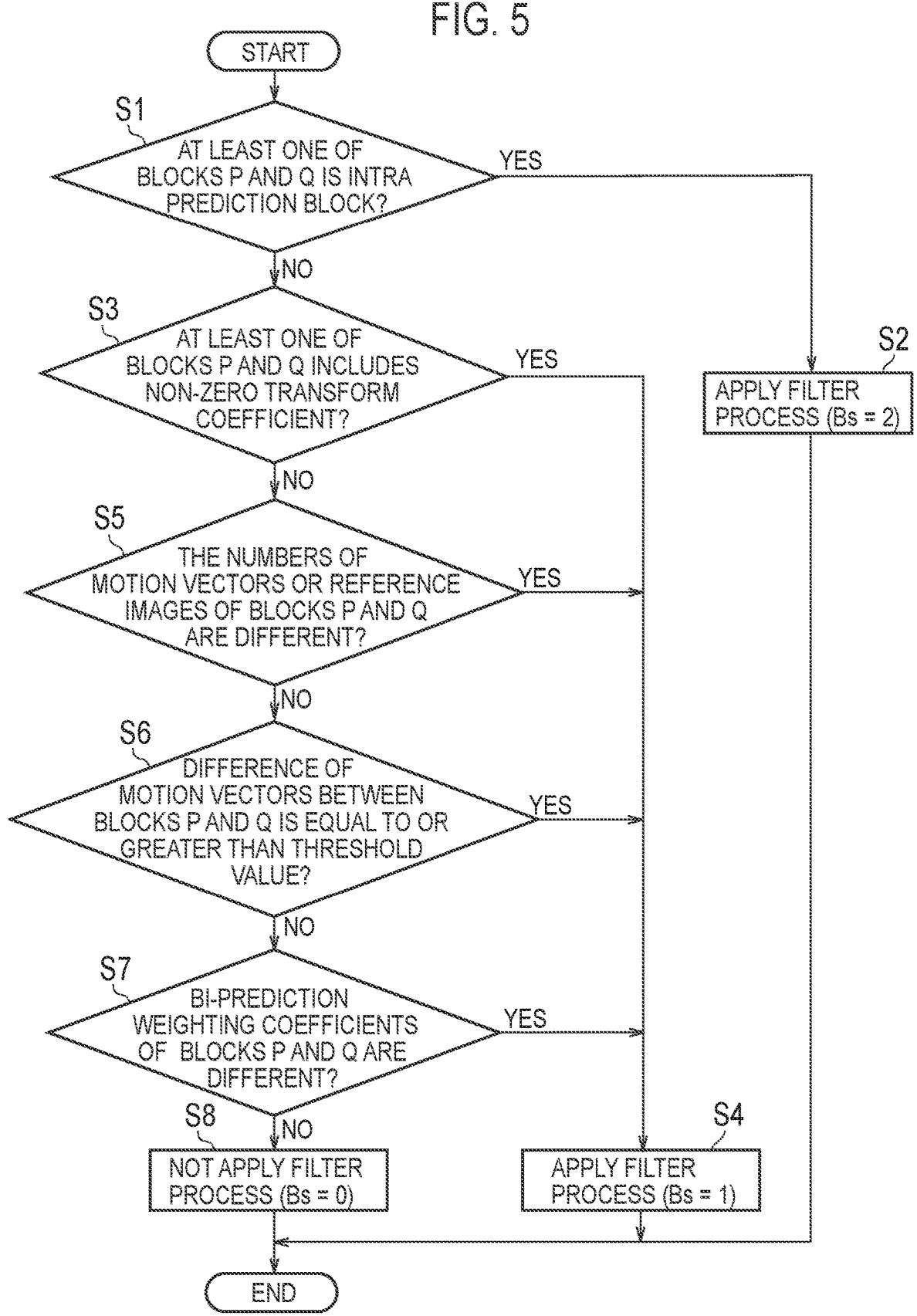

ENCODING DEVICE, DECODING DEVICE AND PROGRAM

RELATED APPLICATIONS

The present application is a continuation based on PCT Application No. PCT/JP2020/032782, filed on Aug. 28, 2020, which claims the benefit of Japanese Patent Application No. 2019-157240 filed on Aug. 29, 2019. The content of which is incorporated by reference herein in their entirety.

TECHNICAL FIELD

The present invention relates to an encoding device, a decoding device, and a program.

BACKGROUND ART

In HEVC (High Efficiency Video Coding), and VVC (Versatile Video Coding), which is a next-generation encoding scheme, a deblocking filter is adopted as an encoding in-loop filter (for example, see Non Patent Literature 1). The deblocking filter is an in-loop filter to restrain distortion at a block boundary portion when an encoding process is performed on a block basis.

When intra prediction is applied to at least one of two blocks including an encoding-target block and a neighboring block, a filter controller, which controls the deblocking filter, applies the deblocking filter to the boundary portion between the two blocks. When inter prediction is applied to each of two blocks that are adjacent to each other, a filter controller determines whether or not to apply a deblocking filter to a boundary portion between the two blocks in accordance with a degree of match of a value of a motion vector and a reference (reference image) between the two blocks.

Meanwhile, in VVC, a weighted bi-prediction technique called BCW (Bi-prediction with CU-level Weight) is to be adopted. While in bi-prediction in related art, a predicted image is generated by simply averaging two reference images, in weighted bi-prediction, a predicted image is generated by weighted-averaging two reference images. Weighted coefficients to be used to perform weighted averaging is selected from a set of a plurality of weighted coefficients defined in advance.

CITATION LIST

Non Patent Literature

Non Patent Literature 1: Recommendation ITU-T H.265, (December 2016), "High efficiency video coding", International Telecommunication Union

DISCLOSURE OF INVENTION

Technical Problem

When inter prediction is applied to each of two blocks that are adjacent to each other, even if a degree of match of a value of motion vector and a reference between the blocks is high, the following problem can occur. More specifically, when weighted bi-prediction is applied to the blocks, and weighted coefficients applied to the blocks are different from each other, discontinuity between the blocks becomes high, which leads to a problem of deterioration in visual terms.

The present invention therefore provides an encoding device, a decoding device and a program that improve image quality and encoding efficiency by appropriately controlling a deblocking filter.

An encoding device according to a first feature, performs encoding on each of blocks obtained by dividing an image. The encoding device includes: a predictor configured to generate a prediction block of an encoding-target block by weighted-averaging a plurality of reference images using weighted coefficients selected from a weighted coefficient set including a plurality of weighted coefficients; a transformer/quantizer configured to perform a transform process and a quantization process on a prediction residual that represents a difference between the encoding-target block and the prediction block; an inverse quantizer/inverse transformer configured to restore the prediction residual by performing an inverse quantization process and an inverse transform process on transform coefficients obtained by the transformer/quantizer; a combiner configured to reconstruct the encoding-target block by combining the restored prediction residual and the prediction block; a deblocking filter configured to perform a filter process on a boundary portion between two blocks including the reconstructed encoding-target block and an adjacent block; and a filter controller configured to control the deblocking filter based on the weighted coefficients applied to the two blocks by the predictor.

A decoding device according to a second feature performs decoding on each of blocks obtained by dividing an image. The decoding device includes: an entropy decoder configured to output quantized transform coefficients corresponding to a decoding-target block by decoding an encoded stream; an inverse quantizer/inverse transformer configured to restore a prediction residual by performing an inverse quantization process and an inverse transform process on the transform coefficients outputted by the entropy decoder; a predictor configured to generate a prediction block of the decoding-target block by weighted-averaging a plurality of reference images using weighted coefficients selected from a weighted coefficient set including a plurality of weighted coefficients; a combiner configured to reconstruct the decoding-target block by combining the restored prediction residual and the prediction block; a deblocking filter configured to perform a filter process on a boundary portion between two blocks including the reconstructed decoding-target block and an adjacent block; and a filter controller configured to control the deblocking filter based on the weighted coefficients applied to the two blocks by the predictor.

A program according to a third feature causes a computer to function as the encoding device according to the first feature.

A program according to a fourth feature causes a computer to function as the decoding device according to the second feature.

According to the present invention, an encoding device, a decoding device and a program that improve image quality and encoding efficiency by appropriately controlling a deblocking filter, can be provided.

BRIEF DESCRIPTION OF DRAWINGS

FIG. 5 is a diagram illustrating an example of the operation flow of the filter controller according to the embodiment.

DESCRIPTION OF EMBODIMENTS

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

<Encoding Device>

Figure 1:
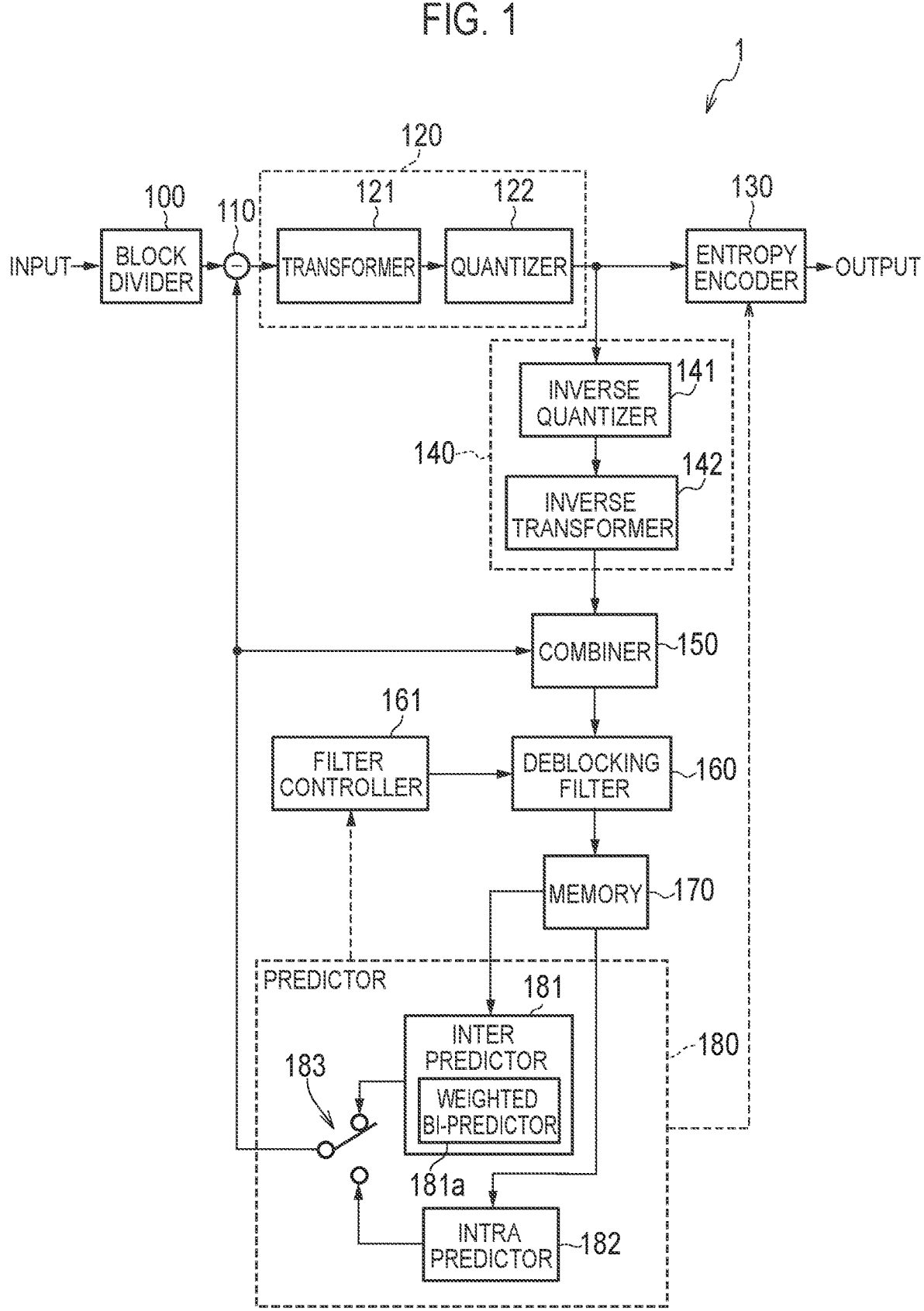
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment. The encoding device 1 is a device that performs encoding on each of blocks obtained by dividing an image.

As illustrated in FIG. 1, the encoding device 1 includes a block divider 100, a subtractor 110, a transformer/quantizer 120, an entropy encoder 130, an inverse quantizer/inverse transformer 140, a combiner 150, a deblocking filter 160, a filter controller 161, a memory 170, and a predictor 180.

The block divider 100 divides an input image given in the form of a frame (or a picture) that constitutes a part of a video into a plurality of image blocks and outputs the resulting image blocks to the subtractor 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The block divider 100 performs block division on a luminance signal and a chrominance signal. Although a following description is given mainly of a case in which shapes made by the block division are identical for the luminance signal and the chrominance signal, the division may be controllable independently for the luminance signal and the chrominance signal. A luminance block and a chrominance block are simply referred to as an encoding-target block when the blocks are not particularly distinguished from each other.

The subtractor 110 calculates prediction residuals that represent differences (errors) between an encoding-target block outputted from the block divider 100 and a prediction block obtained by the predictor 180 predicting the encoding-target block. The subtractor 110 calculates a prediction residual by subtracting each pixel value in the prediction block from each pixel value in the block, and outputs the calculated prediction residuals to the transformer/quantizer 120.

The transformer/quantizer 120 executes a transform process and a quantization process on each of blocks. The transformer/quantizer 120 includes a transformer 121 and a quantizer 122.

The transformer 121 calculates transform coefficients for each frequency component by performing a transform process on the prediction residual outputted from the subtractor 110 and outputs the calculated transform coefficients to the quantizer 122. The transform process (transformation) is a process of transforming a pixel-domain signal into a frequency-domain signal and includes, for example, discrete cosine transform (DCT), discrete sine transform (DST), Karhunen Loeve transform (KLT), an integer transform based on any one of such transforms, or the like.

The quantizer 122 quantizes the transform coefficients outputted from the transformer 121 by using a quantization parameter (Qp) and a quantization matrix, and outputs the quantized transform coefficients to the entropy encoder 130 and the inverse quantizer/inverse transformer 140. The quantization parameter (Qp) is a parameter that is applied in common to each transform coefficient in a block, and is a parameter that determines quantization granularity. The quantization matrix is a matrix that has, as elements, quantization values used when each transform coefficient is quantized.

The entropy encoder 130 performs entropy encoding on the transform coefficients outputted from the quantizer 122, generates an encoded stream (bit stream) by performing data compression, and outputs the encoded stream to an outside of the encoding device 1. For the entropy encoding, Huffman coding, CABAC (Context-based Adaptive Binary Arithmetic Coding), or the like can be used. Also, the entropy encoder 130 acquires information on the size, the shape and the like of each encoding-target block from the block divider 100, acquires information related to prediction (for example, information on a prediction mode and a motion vector) from the predictor 180, and performs encoding also on the information.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the transform coefficients outputted from the quantizer 122 by using the quantization parameter (Qp) and the quantization matrix to restore the transform coefficients, and outputs the restored transform coefficients to the inverse transformer 142.

The inverse transformer 142 performs the inverse transform process corresponding to the transform process performed by the transformer 121. For example, when the transformer 121 performs DCT, the inverse transformer 142 performs inverse DCT. The inverse transformer 142 restores the prediction residual by performing the inverse transform process on the transform coefficients outputted from the inverse quantizer 141 and outputs a restoration prediction residual that is the restored prediction residual to the combiner 150.

The combiner 150 combines the restoration prediction residual outputted from the inverse transformer 142 with a prediction block outputted from the predictor 180, on a pixel-by-pixel basis. The combiner 150 reconstructs (decodes) an encoding-target block by adding individual pixel values of the restoration prediction residual to individual pixel values of the prediction block and outputs a decoded image (reconstructed block) on each of reconstructed blocks to the deblocking filter 160.

The deblocking filter 160 performs a filter process on a boundary portion between two blocks (hereinafter, referred to as a "target block pair") including the reconstructed block and an adjacent block adjacent to the reconstructed block and outputs the reconstructed block after the filter process to the memory 170. The filter process is a process for mitigating signal deterioration caused by the block-based processes and is a filter process of smoothing a signal gap at the boundary portion of the target block pair. The deblocking filter 160 is configured, in general, as a low-pass filter that makes signal changes more gradual.

The filter controller 161 controls the deblocking filter 160. More specifically, the filter controller 161 controls whether or not the filter process is performed on the target block pair, and boundary strength (Bs) of the deblocking filter 160. The boundary strength Bs refers to a parameter for determining whether or not a filter process is performed and a type of the filter process. Note that control of whether or not the filter process is performed can be regarded as control of whether the boundary strength Bs is set to one or more, or to zero.

The filter controller 161 controls the deblocking filter 160, based on variations of pixel values in an area near the boundary of the target block pair, the prediction mode, the quantization parameter, and values of motion vectors used in motion-compensated prediction (inter prediction). Operation of the filter controller 161 will be described in detail later.

The memory 170 accumulates reconstructed blocks outputted from the deblocking filter 160 as decoded images in units of frames. The memory 170 outputs the stored decoded images to the predictor 180.

The predictor 180 generates a prediction block corresponding to an encoding-target block by performing a prediction process in units of the block, and outputs the generated prediction block to the subtractor 110 and the combiner 150. The predictor 180 includes an inter predictor 181, an intra predictor 182 and a switcher 183.

The inter predictor 181 calculates a motion vector through a scheme such as block matching by using, for a reference image, a decoded image stored in the memory 170, generates an inter prediction block by predicting an encoding-target block, and outputs the generated inter prediction block to the switcher 183. The inter predictor 181 selects an optimal inter prediction method, from inter prediction using a plurality of reference images (typically, bi-prediction) and inter prediction using one reference image (uni-directional prediction), and performs inter prediction by using the selected inter prediction method. The inter predictor 181 outputs information related to inter prediction (the motion vector and the like) to the entropy encoder 130 and the filter controller 161.

In the present embodiment, the inter predictor 181 includes a weighted bi-predictor 181a that generates an inter prediction block by weighted-averaging two reference images. Weighted coefficients to be used to perform weighted averaging is selected from a set of a plurality of weighted coefficients defined in advance. More specifically, the weighted bi-predictor 181a generates an inter prediction block using the following expression (1) when one reference image is set at "$P_0$", the other reference image is set at "$P_1$", and the weighted coefficient is set at "w".

[Expression 1]

$$P_{bi\text{-}pred} = ((8-w)*P_0 + w*P_1 + 4) >> 3 \quad (1)$$

Here, the weighted coefficient "w" is selected from a set including −2, 2, 4, 6, and 10. According to such weighted bi-prediction, prediction accuracy can be improved compared to bi-prediction in related art in which an inter prediction block is generated by simply averaging two reference images.

The intra predictor 182 selects an optimal intra prediction mode to be applied to an encoding-target block from among a plurality of intra prediction modes, and predicts the encoding-target block by using the selected intra prediction mode. The intra predictor 182 generates an intra prediction block by referencing decoded pixel values adjacent to the encoding-target block of a decoded image stored in the memory 170, and outputs the generated intra prediction block to the switcher 183. The intra predictor 182 outputs information related to the selected intra prediction mode to the entropy encoder 130 and the filter controller 161.

The switcher 183 switches the prediction block between the inter prediction block outputted from the inter predictor 181 and the intra prediction block outputted from the intra predictor 182 and outputs one of the prediction blocks to the subtractor 110 and the combiner 150.

As described above, the encoding device 1 according to the present embodiment includes: the weighted bi-predictor 181a configured to generate a prediction block of an encoding-target block by weighted-averaging a plurality of reference images using weighted coefficients selected from a weighted coefficient set including a plurality of weighted coefficients; the transformer/quantizer 120 configured to perform a transform process and a quantization process on a prediction residual that represents a difference between the encoding-target block and the prediction block; the inverse quantizer/inverse transformer 140 configured to restore the prediction residual by performing an inverse quantization process and an inverse transform process on transform coefficients obtained by the transformer/quantizer 120; the combiner 150 configured to reconstruct the encoding-target block by combining the restored prediction residual and the prediction block; and the deblocking filter 160 configured to perform a filter process on a boundary portion between two blocks including the reconstructed encoding-target block and an adjacent block.

Figure 2:
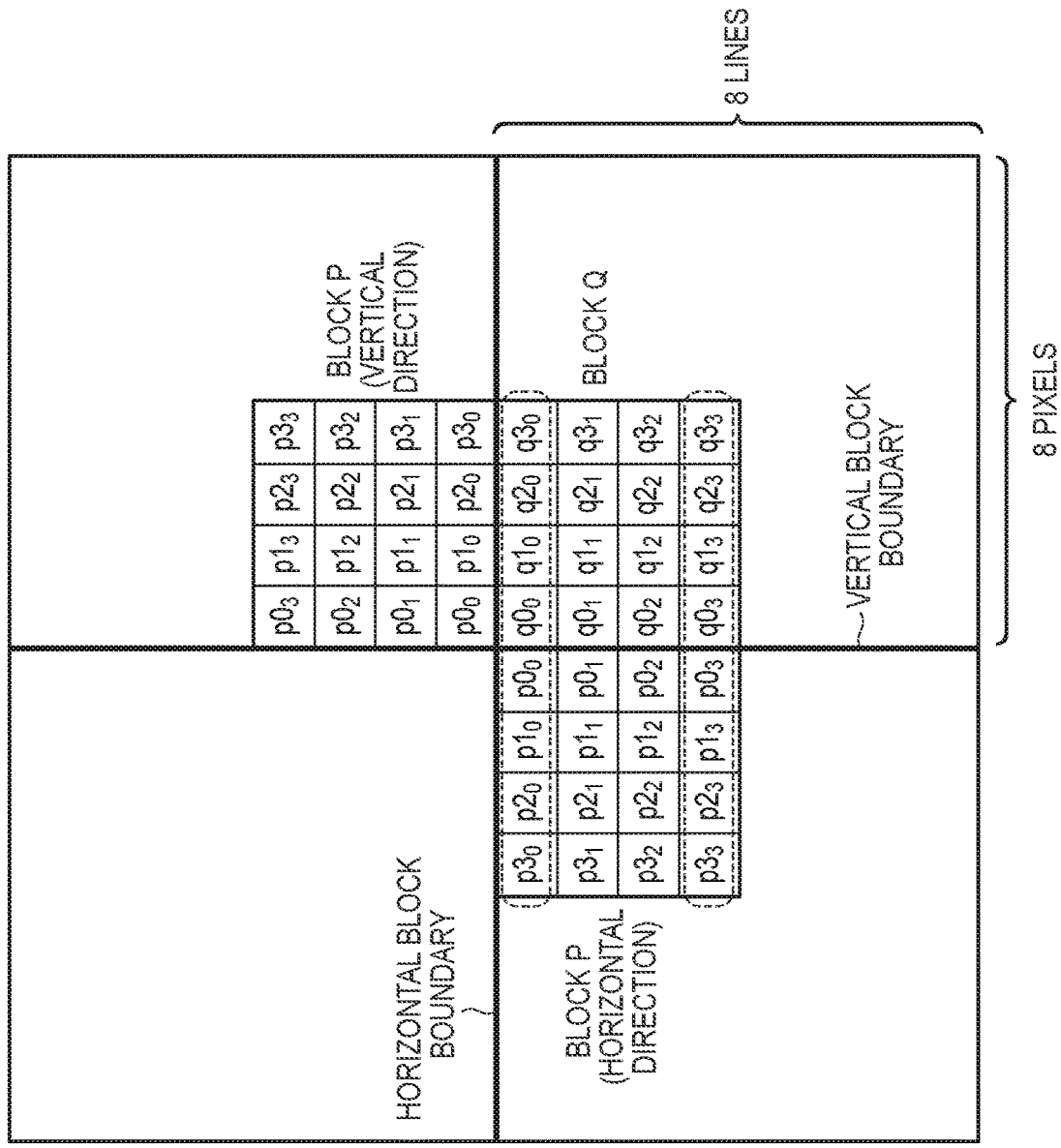
FIG. 2 is a diagram illustrating an example of the operation of a deblocking filter according to the embodiment.

Operation of the deblocking filter 160 and the filter controller 161 according to the present embodiment will be described next. FIG. 2 is a diagram illustrating an example of operation of the deblocking filter 160 according to the present embodiment. In FIG. 2, a block Q is a reconstructed block corresponding to the encoding-target block, and a block P is a reconstructed block adjacent to the block Q.

In the example illustrated in FIG. 2, the deblocking filter 160 performs the filter process with a block size of 8×8 pixels. The filter controller 161 obtains boundary strength Bs, for example, based on Table 1 below. In the present embodiment, it is assumed that the value of the boundary strength Bs is any one of 0, 1, 2.

TABLE 1

| Bs value | Conditions for determining Bs value |
|---|---|
| 2 | Intra prediction is applied to at least one of blocks |
| 1 | At least one of blocks includes non-zero transform coefficient |
| 1 | The numbers of motion vectors or reference images of both blocks are different |
| 1 | Difference between motion vectors of both blocks is equal to or greater than threshold value |
| 1 | Weighted coefficients for weighted bi-prediction of both blocks are different |
| 0 | Other than above |

As illustrated in FIG. 2 and Table 1, the filter controller 161 sets the value of Bs to 2 when intra prediction is applied to at least one of the blocks P and Q.

The filter controller 161 sets the value of Bs to 1 when motion-compensated prediction (inter prediction) is applied to both of the blocks P and Q, and when at least one condition of the following (a) to (d) is satisfied, and otherwise sets the value of Bs to 0.

(a) At least one of the blocks P and Q includes a significant transform coefficient (that is, a non-zero coefficient).

(b) The numbers of motion vectors of the blocks P and Q, or reference images thereof, are different.

(c) The absolute value of a difference between motion vectors of the blocks P and Q is equal to or greater than a threshold value (for example, one pixel).

(d) Weighted coefficients for weighted bi-prediction of the blocks P and Q are different.

Note that in motion-compensated prediction in the present invention, a decoded frame in the past or in the future in terms of time based on the encoding-target frame can be utilized as a reference image. For example, when two reference pixels to be used by the block P and the block Q in bi-prediction to generate a prediction image are respectively set as P0 and P1, and Q0 and Q1, there is a case where P0 and Q0 refer to a decoded frame in the past, and P1 and Q1 refer to a decoded frame in the future. In such a case, as described above, the value of Bs is determined based on a degree of match of values of motion vectors and references with which a prediction block (Pbi-pred) of the block P is generated by bi-prediction and a prediction block (Qbi-pred) of the block Q is generated by bi-prediction, and whether weighted coefficients used for generating Pbi-pred and Qbi-pred match.

Even when references indicated by the motion vectors of P0 and Q0, and P1 and Q1 are different such as when P0 and Q1 refer to the decoded frame in the past, and P1 and Q0 refer to the decoded frame in the future, and when P1 and Q0 refer to the decoded frame in the past, and P0 and Q1 refer to the decoded frame in the future, the following process may be performed. More specifically, when a degree of match of the values of the motion vectors and the references of P0 and Q1 is high and a degree of match of the values of the motion vectors and the references of P1 and Q0 is high, the value of Bs may be determined in accordance with whether or not weighted coefficients used to generate a prediction image of the block P and weighted coefficients used to generate a prediction image of the block Q satisfy a certain condition.

For example, even when weighted coefficients Wp used to generate a prediction image of the block P is 2, and weighted coefficients Wq used to generate a prediction image of the block Q is 6, when a degree of match of the values of the motion vectors and the references of P1 and Q0 is high, the value of Bs is set to 0 when $$Wp=8-Wq$$

is satisfied.

Note that weight flags indicating the weighted coefficients w=−2, 2, 4, 6 and 10 may be respectively allocated as 0, 1, 2, 3 and 4. More specifically, when Wp is 2, a weight flag Fp of the block P is 1. When Wq is 6, a weight flag Fq of the block Q is 3. In this manner, the weighted coefficients to be applied to the blocks are indicated using the weight flags of 0 to 4 as described above. When the flags indicating the weighted coefficients are allocated in this manner, the value of Bs is determined based on the flags allocated to the block P and the block Q.

For example, when degrees of match of the values of the motion vectors of P0 and Q0, and P1 and Q1 are high and when values of the flags Fp and Fq corresponding to the weights Wp and Wq to be applied to the blocks are the same, the value of Bs is set to 0. Meanwhile, when degrees of match of the values of the motion vectors and the references of P0 and Q1, and P1 and Q0 are high, the value of Bs is set to 0 when Fp and Fq satisfy $$Fp=N-1-Fq$$

where N is the number of flags which can be selected, and in the above-described example, N is 5.

When the value of the boundary strength Bs is 0, the filter controller 161 controls the deblocking filter 160 such that the filter process is not performed. Hereinafter, a description is given, taking the boundary between vertical blocks illustrated in FIG. 2 as an example.

When the value of the boundary strength Bs is 1 or 2, the filter controller 161 may control the deblocking filter 160 such that the filter process is performed only when the following expression (1) is satisfied.

[Expression 2]

$$|p2_0-2p1_0+p0_0|+|p2_3-2p1_3+p0_3|+|q2_0-2q1_0+q0_0|+|q2_3-2q1_3+q0_3|<\beta \quad (1)$$

Note that when the filter process is performed, the filter controller 161 may apply a stronger filter when all of the following conditional expressions (2) to (7) are satisfied, and otherwise, apply a weaker filter.

[Expression 3]

$$2(|p2_0-2p1_0+p0_0|+|q2_0|+|q2_0-2q1_0+q0_0|)<\beta/4 \quad (2)$$

$$2(|p2_3-2p1_3+p0_3|+|q2_3-2q1_3+q0_3|)<\beta/4 \quad (3)$$

$$|p3_0-p0_0|+|q0_0-q3_0|\beta/8 \quad (4)$$

$$|p3_3-p0_3|+|q0_3-q3_3|<\beta/8 \quad (5)$$

$$|p0_0-q0_0|<(5t_C+1)/2 \quad (6)$$

$$|p0_3-q0_3|<(5t_C+1)/2 \quad (7)$$

However, a threshold value $\beta$ and a value $t_C$ change according to an average value $Q_{av}$ of the quantization parameter of the adjacent blocks P and Q.

As described above, the filter controller 161 according to the present embodiment controls the deblocking filter 160 such that the filter process is not performed based on the fact that the weighted coefficients applied to one of the blocks P and Q is the same as the weighted coefficients applied to the other as in the above-described (d). The filter controller 161 according to the present embodiment controls the deblocking filter 160 such that the filter process is performed based on the fact that the weighted coefficients applied to one of the blocks P and Q is different from the weighted coefficients applied to the other.

Thus, when inter prediction is applied to each of two blocks that are adjacent to each other, when weighted bi-prediction is applied to each block, and weighted coefficients applied to the blocks are different from each other, by applying the filter process of the deblocking filter 160, deterioration in visual terms due to discontinuity between the blocks can be prevented.

Figure 3:
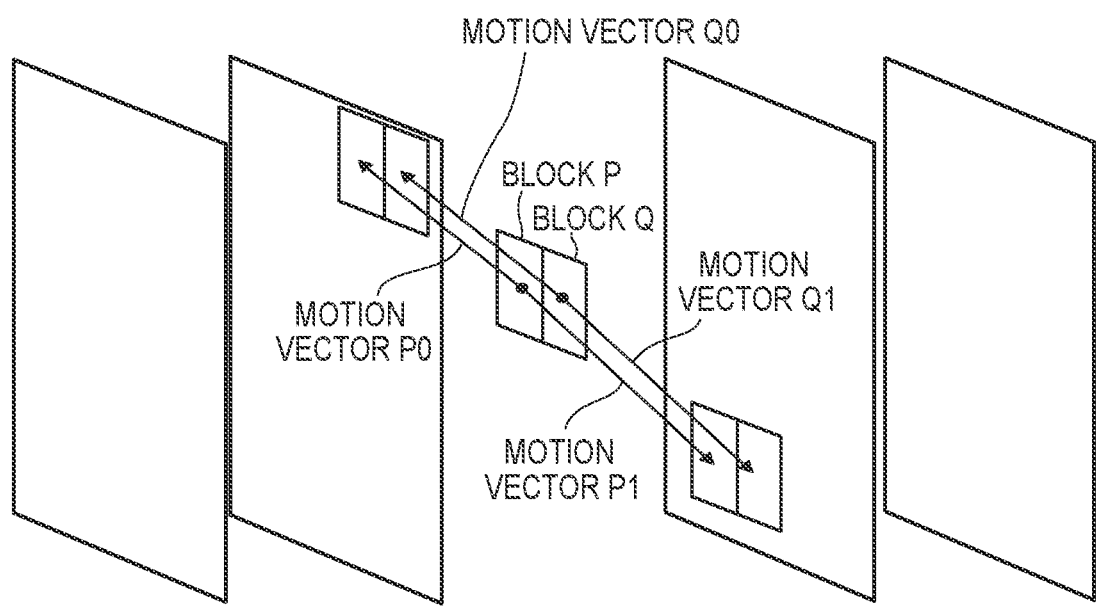
FIG. 3 is a diagram explaining a specific example of the operation of a filter controller according to the embodiment.

A specific example of operation of the filter controller 161 according to the present embodiment will be described next. FIG. 3 is a diagram for explaining a specific example of operation of the filter controller 161 according to the present embodiment.

As illustrated in FIG. 3, it is assumed that prediction applied to the blocks P and Q is both bi-prediction. Further, neither of the blocks P and Q includes a non-zero transform coefficient.

Two motion vectors to be used by the block P in bi-prediction are P0 and P1. Two motion vectors to be used by the block Q in bi-prediction are Q0 and Q1. P0 and Q0 refer to the same frame, and P1 and Q1 refer to the same frame. Further, a difference between the values of the motion vectors of P0 and Q0 is equal to or less than the threshold value, and a difference between the values of the motion vectors of P1 and Q1 is equal to or less than the threshold value.

In such a case, none of the above-described conditions (a) to (c) is satisfied. However, when weighted bi-prediction is applied to the blocks P and Q and weighted coefficients "w" applied to the blocks are different, discontinuity can occur between the block P and the block Q.

In the present embodiment, the above-described condition (d) is newly introduced. Thus, even when none of the above-described conditions (a) to (c) is satisfied, when the above-described condition (d) is satisfied, the deblocking filter 160 can be controlled such that the filter process is performed by setting the value of Bs at 1.

<Configuration of Decoding Device>

Figure 4:
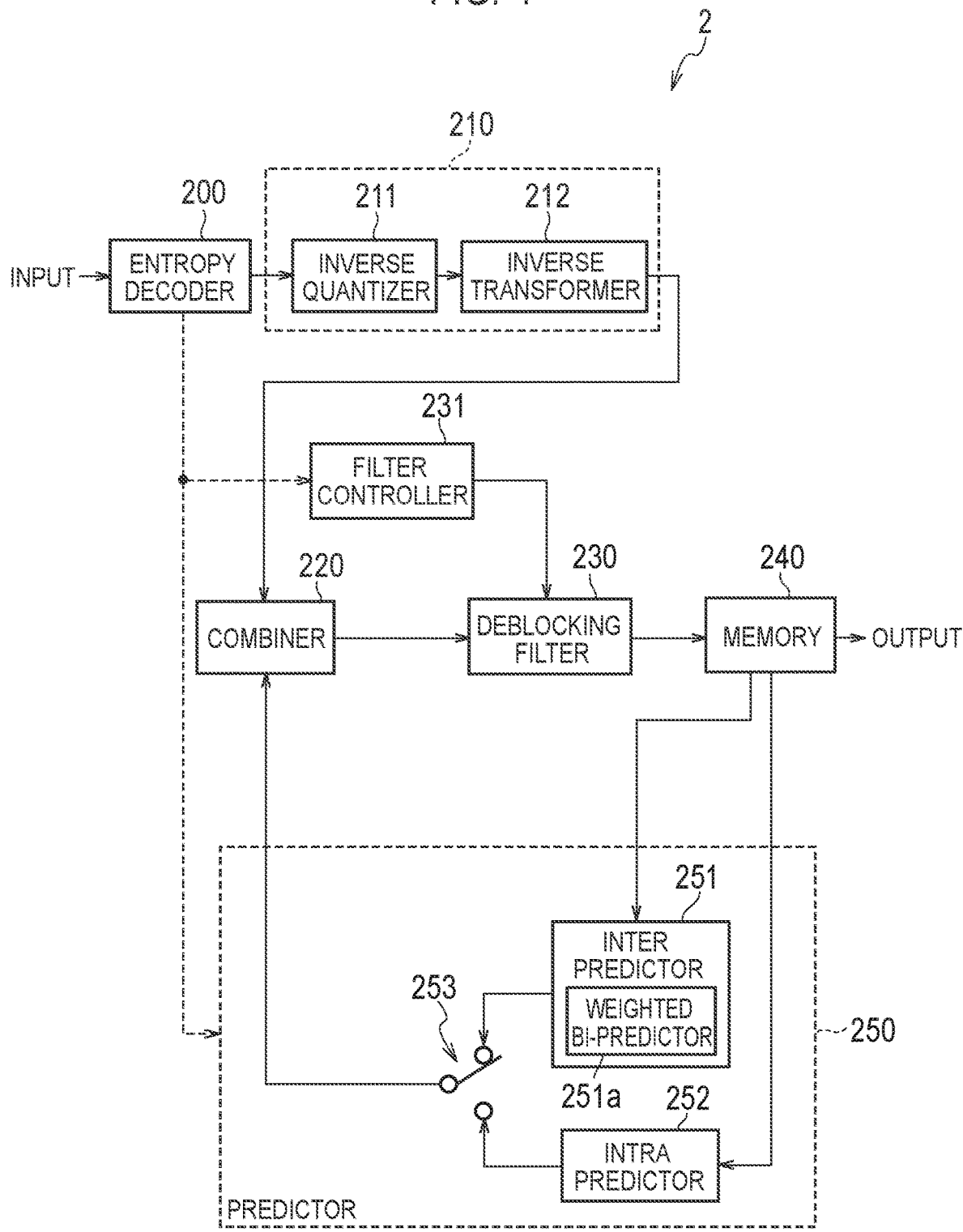
FIG. 4 is a diagram illustrating the configuration of a decoding device according to the embodiment.

Next, a configuration of the decoding device according to the present embodiment is described, focusing mainly on differences from the configuration of the encoding device described above. FIG. 4 is a diagram illustrating the configuration of the decoding device 2 according to the present embodiment. The decoding device 2 is a device that decodes a decoding-target block from an encoded stream.

As illustrated in FIG. 4, the decoding device 2 includes an entropy decoder 200, an inverse quantizer/inverse transformer 210, a combiner 220, a deblocking filter 230, a filter controller 231, a memory 240, and a predictor 250.

The entropy decoder 200 decodes various signaling information by decoding an encoded stream generated by the encoding device 1. More specifically, the entropy decoder 200 acquires information related to prediction applied to a decoding-target block (for example, prediction type information, motion vector information) and outputs the acquired information to the predictor 250 and the filter controller 231.

The entropy decoder 200 decodes the encoded stream, acquires quantized transform coefficients, and outputs the acquired transform coefficients to the inverse quantizer/inverse transformer 210 (inverse quantizer 211).

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse-quantizes the quantized transform coefficients outputted from the entropy decoder 200 by using the quantization parameter (Qp) and the quantization matrix to restore transform coefficients in the decoding-target block, and outputs the restored transform coefficients to the inverse transformer 212.

The inverse transformer 212 performs an inverse transform process corresponding to the transform process performed by the transformer 121 of the encoding device 1. The inverse transformer 212 restores the prediction residual by performing the inverse transform process on the transform coefficients outputted from the inverse quantizer 211 and outputs the restored prediction residual (restoration prediction residual) to the combiner 220.

The combiner 220 reconstructs (decodes) the decoding-target block by combining the prediction residual outputted from the inverse transformer 212 and a prediction block outputted from the predictor 250 on a pixel-by-pixel basis, and outputs a reconstructed block to the deblocking filter 230.

The deblocking filter 230 performs operation similar to the operation of the deblocking filter 160 of the encoding device 1. The deblocking filter 230 performs a filter process on the boundary of a target block pair including the reconstructed block outputted from the combiner 220 and a block adjacent to the reconstructed block and outputs the reconstructed block after the filter process to the memory 240.

The filter controller 231 performs operation similar to the operation of the filter controller 161 of the encoding device 1, based on the information outputted from the entropy decoder 200. The filter controller 231 selects boundary strength Bs, for example, through the method illustrated in Table 1 and controls the deblocking filter 230 according to the selected boundary strength Bs.

The memory 240 stores the reconstructed blocks outputted from the deblocking filter 230 as decoded images in units of frames. The memory 240 outputs the decoded images in units of frames to an outside of the decoding device 2.

The predictor 250 performs prediction in units of blocks. The predictor 250 includes an inter predictor 251, an intra predictor 252, and a switcher 253.

The inter predictor 251 predicts a decoding-target block through inter prediction by using, for a reference image, a decoded image stored in the memory 240. The inter predictor 251 generates an inter prediction block by performing inter prediction, by using the motion vector information outputted from the entropy decoder 200, and outputs the generated inter prediction block to the switcher 253.

In the present embodiment, the inter predictor 251 includes a weighted bi-predictor 251a that generates an inter prediction block by weighted-averaging two reference images. The weighted bi-predictor 251a generates an inter prediction block through the above-described expression (1).

The intra predictor 252 references reference pixels adjacent to a decoding-target block of a decoded image stored in the memory 240, and predicts the decoding-target block through intra prediction, based on the information outputted from the entropy decoder 200. The intra predictor 252 generates an intra-prediction block, and outputs the generated intra prediction block to the switcher 253.

The switcher 253 switches the prediction block between the inter prediction block outputted from the inter predictor 251 and the intra prediction block outputted from the intra predictor 252 and outputs one of the prediction blocks to the combiner 220.

As described above, the decoding device 2 according to the present embodiment includes: the entropy decoder 200 configured to output quantized transform coefficients corresponding to a decoding-target block by decoding an encoded stream; the inverse quantizer/inverse transformer 210 configured to restore a prediction residual by performing an inverse quantization process and an inverse transform process on the transform coefficients outputted by the entropy decoder 200; the weighted bi-predictor 251a configured to generate a prediction block of the decoding-target block by weighted-averaging a plurality of reference images using weighted coefficients selected from a weighted coefficient set including a plurality of weighted coefficients; the combiner 220 configured to reconstruct the decoding-target block by combining the restored prediction residual and the prediction block; and the deblocking filter 230 configured to perform a filter process on a boundary portion of two blocks including the reconstructed decoding-target block and an adjacent block.

Here, the filter controller 231 performs the operation as illustrated in FIG. 3. In other words, even when none of the above-described conditions (a) to (c) is satisfied, the filter controller 231 sets the value of Bs to 1 when the above-described condition (d) is satisfied. Thus, when weighted coefficients in weighted bi-prediction of the blocks P and Q are different, the deblocking filter 160 can be controlled such that a filter process is performed.

<Example of Operation of Filter Controller>

Next, an example of the operation of the filter controllers 161 and 231 according to the present embodiment is described. Since the filter controllers 161 and 231 perform the same operation, a description is given by taking the filter controller 231 as an example. FIG. 5 is a diagram illustrating the example of the operation flow of the filter controller 231 according to the present embodiment.

As illustrated in FIG. 5, in step S1, the filter controller 231 determines whether or not intra prediction is applied to at least one of the target block pair including the blocks P and Q. When intra prediction is applied to at least one of the target block pair (step S1: YES), in step S2, the filter controller 231 controls the deblocking filter 230 such that a filter process is performed. More specifically, the filter controller 231 selects the boundary strength Bs=2.

When intra prediction is applied to neither of the target block pair (step S1: NO), that is, inter prediction is applied to both of the target block pair, in step S3, the filter controller 231 determines whether or not at least one of the target block pair includes a non-zero transform coefficient. When at least one of the target block pair includes a non-zero transform coefficient (step S3: YES), in step S4, the filter controller 231 controls the deblocking filter 230 such that a filter process is performed. More specifically, the filter controller 231 selects the boundary strength Bs=1.

When neither of the target block pair includes a non-zero transform coefficient (step S3: NO), that is, when the prediction block is set as the reconstructed block as is, in step S5, the filter controller 231 determines whether or not the numbers of motion vectors and the reference images (reference frames) of the target block pair are different. When the numbers of the motion vectors and the reference images of the target block pair are different (step S5: YES), in step S4, the filter controller 231 controls the deblocking filter 230 such that a filter process is performed. More specifically, the filter controller 231 selects the boundary strength Bs=1.

When the numbers of motion vectors and the reference images of the target block pair are the same (step S5: NO), in step S6, the filter controller 231 determines whether or not a difference between the motion vectors of the target block pair is equal to or greater than a threshold value. When the difference between the motion vectors of the target block pair is equal to or greater than the threshold value (step S6: YES), in step S4, the filter controller 231 controls the deblocking filter 230 such that a filter process is performed. More specifically, the filter controller 231 selects the boundary strength Bs=1.

When the difference between the motion vectors of the target block pair is less than the threshold value (step S6: NO), for example, when values of the motion vectors of the target block pair are the same, in step S7, the filter controller 231 determines whether or not weighted coefficients "w" of the target block pair in weighted bi-prediction are different. When the weighted coefficients "w" of the target block pair in weighted bi-prediction are different (step S7: YES), in step S4, the filter controller 231 controls the deblocking filter 230 such that a filter process is performed. More specifically, the filter controller 231 selects the boundary strength Bs=1.

When the weighted coefficients "w" of the target block pair in weighted bi-prediction are the same (step S7: NO), in step S8, the filter controller 231 controls the deblocking filter 230 such that a filter process is not performed. More specifically, the filter controller 231 selects the boundary strength Bs=0.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that performs encoding on each of blocks obtained by dividing an image, the encoding device comprising:
    a predictor configured to generate a prediction block of an encoding-target block by weighted-averaging a plurality of reference images using weighted coefficients determined based on a flag controlling the weighted coefficients from a weighted coefficient set including a plurality of weighted coefficients;
    a transformer/quantizer configured to perform a transform process and a quantization process on a prediction residual that represents a difference between the encoding-target block and the prediction block;
    an inverse quantizer/inverse transformer configured to restore the prediction residual by performing an inverse quantization process and an inverse transform process on transform coefficients obtained by the transformer/quantizer;
    a combiner configured to reconstruct the encoding-target block by combining the restored prediction residual and the prediction block;
    a deblocking filter configured to perform a filter process on a boundary portion between two blocks including the reconstructed encoding-target block and an adjacent block; and
    a filter controller configured to control a strength of the filter process based on the flag controlling the weighted coefficients used in the weighted-averaging in generating the prediction block.

2. The encoding device according to claim 1, wherein the filter controller is configured to control the deblocking filter based on whether or not the weighted coefficients applied to one of the two blocks is the same as the weighted coefficients applied to the other of the two blocks.

3. The encoding device according to claim 2, wherein the filter controller is configured to:
control the deblocking filter such that the filter process is not performed, based on a fact that the weighted coefficients applied to one of the two blocks is the same as the weighted coefficients applied to the other of the two blocks; and
control the deblocking filter such that the filter process is performed, based on a fact that the weighted coefficients applied to one of the two blocks is different from the weighted coefficients applied to the other of the two blocks.

4. A decoding device that performs decoding on each of blocks obtained by dividing an image, the decoding device comprising:
an entropy decoder configured to output quantized transform coefficients corresponding to a decoding-target block by decoding an encoded stream;
an inverse quantizer/inverse transformer configured to restore a prediction residual by performing an inverse quantization process and an inverse transform process on the quantized transform coefficients outputted by the entropy decoder;
a predictor configured to generate a prediction block of the decoding-target block by weighted-averaging a plurality of reference images using weighted coefficients selected based on a flag controlling weighted coefficients;
a combiner configured to reconstruct the decoding-target block by combining the restored prediction residual and the prediction block;
a deblocking filter configured to perform a filter process on a boundary portion between two blocks including the reconstructed decoding-target block and an adjacent block; and
a filter controller configured to control a strength of the filter process based on the flag controlling the weighted coefficients used in the weighted-averaging in generating the prediction block.

5. The decoding device according to claim 4, wherein
the predictor is configured to generate the prediction block by weighted-averaging using the weighted coefficients selected from a weighted coefficient set including a plurality of weighted coefficients, and
the filter controller is configured to control the deblocking filter based on the weighted coefficients applied to the two blocks by the predictor.

6. The decoding device according to claim 5, wherein the filter controller is configured to control the deblocking filter based on whether or not the weighted coefficients applied to one of the two blocks is the same as the weighted coefficients applied to the other of the two blocks.

7. The decoding device according to claim 6, wherein the filter controller is configured to:
control the deblocking filter such that the filter process is not performed, based on a fact that the weighted coefficients applied to one of the two blocks is the same as the weighted coefficients applied to the other of the two blocks; and
control the deblocking filter such that the filter process is performed, based on a fact that the weighted coefficients applied to one of the two blocks is different from the weighted coefficients applied to the other of the two blocks.

8. A non-transitory computer-readable medium storing a program causing a computer to function as the encoding device according to claim 1.

9. A non-transitory computer-readable medium storing a program causing a computer to function as the decoding device according to claim 4.

10. The encoding device according to claim 1, wherein
the predictor is further configured to generate another prediction block of another encoding-target block by weighted-averaging a plurality of reference images using other weighted coefficients selected from the weighted coefficient set, the another encoding-target block being adjacent to the encoding-target block,
the transformer/quantizer is further configured to perform a transform process and a quantization process on another prediction residual that represents a difference between the another encoding-target block and the another prediction block,
the inverse quantizer/inverse transformer is further configured to restore the another prediction residual,
the combiner is further configured to reconstruct the another encoding-target block by combining the another restored prediction residual and the another prediction block,
the deblocking filter is configured to perform the filter process on the boundary portion between the two blocks including the reconstructed encoding-target block and the another reconstructed encoding-target block as the adjacent block, and
the filter controller is configured to control the deblocking filter based on the weighted coefficients used in the weighted-averaging to generate the prediction block and the other weighted coefficients used in the weighted-averaging to generate the another prediction block.

11. The decoding device according to claim 4, wherein
the entropy decoder is further configured to output another quantized transform coefficients corresponding to another decoding-target block, the another decoding-target block being adjacent to the decoding-target block,
the inverse quantizer/inverse transformer is further configured to restore another prediction residual by performing an inverse quantization process and an inverse transform process on the another quantized transform coefficients,
the predictor is further configured to generate another prediction block of the another decoding-target block by weighted-averaging a plurality of reference images using weighted coefficients selected based on another flag controlling weighted coefficients,
the combiner is further configured to reconstruct the another decoding-target block by combining the another restored prediction residual and the another prediction block,
the deblocking filter is configured to perform the filter process on the boundary portion between the two blocks including the reconstructed decoding-target block and the another reconstructed decoding-target block as the adjacent block, and
the filter controller is configured to control the deblocking filter based on the flag and the another flag.

* * * * *